(12) United States Patent
Kunz et al.

(10) Patent No.: US 8,279,105 B2
(45) Date of Patent: Oct. 2, 2012

(54) METHODS AND APPARATUS FOR CONFIGURING A RECEIVER

(75) Inventors: Scott Kunz, Apalachin, NY (US); Walter S. Richter, Newark Valley, NY (US); Jerry L. Twoey, Owego, NY (US); Barrett L. Snedaker, Endicott, NY (US); Shawn Halferty, Endicott, NY (US); Douglas N. McMartin, Apalachin, NY (US); Stephen A. Orzechowski, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 176 days.

(21) Appl. No.: 11/971,603

(22) Filed: Jan. 9, 2008

(65) Prior Publication Data

US 2008/0180309 A1 Jul. 31, 2008

Related U.S. Application Data

(60) Provisional application No. 60/879,912, filed on Jan. 10, 2007.

(51) Int. Cl.
*G01S 7/40* (2006.01)
*G01S 13/00* (2006.01)

(52) U.S. Cl. .............. 342/20; 342/13; 342/89; 342/175; 342/195

(58) Field of Classification Search .............. 342/13–20, 342/89–103, 147, 158, 165, 173, 175, 192–197, 342/350, 385, 417, 418, 422–424; 455/403, 455/422.1, 423, 425, 130, 226.1; 702/127, 702/189, 190; 707/100, 102; 706/10; 375/316, 375/322, 324, 328; 24/76.11, 76.12, 76.19, 324/76.22, 77.11, 76.36

See application file for complete search history.

(56) References Cited

U.S. PATENT DOCUMENTS

| | | | | |
|---|---|---|---|---|
| 3,277,468 A | * | 10/1966 | Caspers | 342/16 |
| 3,922,676 A | * | 11/1975 | O'Berry et al. | 342/13 |
| 4,025,920 A | * | 5/1977 | Reitboeck et al. | 342/13 |
| 4,040,054 A | * | 8/1977 | Overman | 342/13 |
| 4,695,790 A | * | 9/1987 | Mathis | 324/76.36 |
| 4,726,050 A | * | 2/1988 | Menich et al. | 455/425 |
| 4,750,215 A | * | 6/1988 | Biggs | 455/226.1 |
| 4,845,682 A | * | 7/1989 | Boozer et al. | 342/16 |
| 4,860,318 A | * | 8/1989 | Shaw et al. | 375/328 |
| 4,862,175 A | * | 8/1989 | Biggs et al. | 342/20 |
| 4,922,256 A | * | 5/1990 | Brandstetter | 342/196 |
| 5,061,930 A | * | 10/1991 | Nathanson et al. | 342/13 |
| 5,122,801 A | * | 6/1992 | Hughes | 342/13 |
| 5,285,209 A | * | 2/1994 | Sharpin et al. | 342/13 |
| 5,293,114 A | * | 3/1994 | McCormick et al. | 324/76.22 |
| 5,361,069 A | * | 11/1994 | Klimek et al. | 342/20 |
| 5,363,103 A | * | 11/1994 | Inkol | 342/13 |
| 5,396,250 A | * | 3/1995 | Tsui et al. | 342/13 |
| 5,563,806 A | * | 10/1996 | Barry et al. | 702/190 |
| 5,583,505 A | * | 12/1996 | Andersen et al. | 342/13 |
| 5,610,609 A | * | 3/1997 | Rose | 342/13 |

(Continued)

*Primary Examiner* — Bernarr Gregory
(74) *Attorney, Agent, or Firm* — Wolf, Greenfield & Sacks, P.C.; Randy J. Pritzker

(57) ABSTRACT

Embodiments of the invention relate to configuring a receiver. In some embodiments, when a receiver is executing a dwell, configuration settings for one or more next possible dwells to be executed by the receiver may be sent to the receiver. In this way, when the receiver completes execution of the current dwell, the receiver need not wait to receive configuration settings for the next dwell to be executed as they may be already loaded into the receiver.

17 Claims, 5 Drawing Sheets

U.S. PATENT DOCUMENTS

| | | | |
|---|---|---|---|
| 5,727,204 A * | 3/1998 | Greene, VII | 707/102 |
| 5,884,294 A * | 3/1999 | Kadar et al. | 706/10 |
| 6,163,297 A * | 12/2000 | Rose | 342/418 |
| 6,177,902 B1 * | 1/2001 | Huntley et al. | 342/20 |
| 6,201,493 B1 * | 3/2001 | Silverman | 342/20 |
| 6,313,781 B1 * | 11/2001 | Lee | 342/13 |
| 6,313,794 B1 * | 11/2001 | Rose | 342/424 |
| 6,388,604 B1 * | 5/2002 | Lee | 342/13 |
| 6,507,308 B1 * | 1/2003 | Ono et al. | 342/20 |
| 6,842,137 B2 * | 1/2005 | Gounalis | 342/20 |
| 6,859,160 B1 * | 2/2005 | Gounalis | 342/13 |
| 6,859,161 B1 * | 2/2005 | Bricker et al. | 342/13 |
| 6,873,284 B2 * | 3/2005 | Gounalis | 342/13 |
| 6,894,634 B2 * | 5/2005 | Gounalis | 342/13 |
| 6,894,635 B2 * | 5/2005 | Gounalis | 342/13 |
| 6,917,325 B2 * | 7/2005 | Gounalis | 342/20 |
| 6,989,780 B2 * | 1/2006 | Gounalis | 342/13 |
| 7,038,611 B2 * | 5/2006 | Gounalis | 342/13 |
| 7,068,209 B2 * | 6/2006 | Gounalis | 342/13 |
| 7,109,909 B2 * | 9/2006 | Gounalis | 342/13 |
| 7,148,835 B1 * | 12/2006 | Bricker et al. | 342/20 |
| 7,176,826 B2 * | 2/2007 | Gounalis | 342/13 |
| 7,193,555 B2 * | 3/2007 | Gounalis | 342/13 |
| 7,236,119 B2 * | 6/2007 | Gounalis | 342/20 |
| 7,248,203 B2 * | 7/2007 | Gounalis | 342/13 |
| 7,348,919 B2 * | 3/2008 | Gounalis | 342/165 |
| 7,358,887 B2 * | 4/2008 | Gounalis | 342/20 |
| 7,369,082 B2 * | 5/2008 | Stagliano et al. | 342/175 |
| 7,482,967 B2 * | 1/2009 | Beharrell | 342/20 |
| 2004/0113831 A1 * | 6/2004 | Gounalis | 342/13 |
| 2004/0116090 A1 * | 6/2004 | Gounalis | 342/13 |
| 2004/0119630 A1 * | 6/2004 | Gounalis | 342/13 |
| 2004/0130476 A1 * | 7/2004 | Gounalis | 342/13 |
| 2004/0130477 A1 * | 7/2004 | Gounalis | 342/13 |
| 2004/0130478 A1 * | 7/2004 | Gounalis | 342/14 |
| 2004/0135717 A1 * | 7/2004 | Gounalis | 342/13 |
| 2005/0052311 A1 * | 3/2005 | Gounalis | 342/13 |
| 2005/0052312 A1 * | 3/2005 | Bricker et al. | 342/13 |
| 2006/0097904 A1 * | 5/2006 | Gounalis | 342/13 |
| 2006/0176208 A1 * | 8/2006 | Gounalis | 342/13 |
| 2006/0227035 A1 * | 10/2006 | Gounalis | 342/13 |
| 2006/0290560 A1 * | 12/2006 | Bricker et al. | 342/20 |

* cited by examiner

METHODS AND APPARATUS FOR CONFIGURING A RECEIVER

CROSS-REFERENCE TO RELATED APPLICATIONS

This application claims the benefit under 35 U.S.C. §119(e) to commonly-owned U.S. provisional patent application Ser. No. 60/879,912, entitled METHODS AND APPARATUS FOR USING A RECEIVER, filed on Jan. 10, 2007. This provisional patent application is hereby incorporated by reference in its entirety.

FIELD OF THE INVENTION

Embodiments of the present invention relate to configuring a receiver to execute a dwell.

DESCRIPTION OF THE RELATED ART

Detection systems exist for detecting signals generated by emitters which are of interest. For example, there are scanners (e.g., a police scanner) that are capable of scanning a frequency band for transmissions within that frequency band. In the case of a police scanner, channels are scanned sequentially to find a signal of interest. Scanning is achieved by tuning receiver hardware to a particular frequency to observe one or more transmissions within that particular frequency.

There are more sophisticated systems to detect transmitted signals that use other methods for determining signals of interest. For instance, there are what are referred to as Electronic Support Measures/Electronic Intelligence (ESM/ELINT) systems for conducting surveillance (e.g., radar, and other signals across a wide range of frequency spectrums). These systems detect one or more signals produced by emitters (often called "threats") that are detected and observed.

For example, in a military aircraft or other vehicle, enemy signals (e.g., radar) may be observed that are capable of detecting the vehicle (e.g., an airplane). These threats may need to be determined prior to detection to ensure the safety of the vehicle, and are often observed and classified to identify the particular threat. For example, certain signals may have particular signatures that are indicative of certain types of emitters. Further, there may be a need to detect and identify the location of a threat (e.g., a radar installation) for targeting purposes.

SUMMARY OF THE INVENTION

One embodiment is directed to a method of executing a scan strategy in a receiver. The method comprises acts of: receiving configuration settings for a dwell in the scan strategy to be executed by the receiver; configuring the receiver, according to the configuration settings, to execute the dwell; executing the dwell in the receiver; receiving, during execution of the dwell, configuration settings for each dwell in a set of next possible dwells to be executed by the receiver; and storing the configuration settings for each dwell in the set of next possible dwells in a memory of the receiver. Another embodiment is directed to at least one computer readable medium encoded with instructions that, when executed, perform the above-described method.

A further embodiment is directed to receiver for executing a scan strategy. The receiver comprises: an interface for interfacing with a processor; a memory; and at least one controller, coupled to the memory and the interface, that: receives, via the interface, configuration settings for a dwell in the scan strategy to be executed by the receiver; configures the receiver, according to the configuration settings, to execute the dwell; executes the dwell in the receiver; receives via the interface, during execution of the dwell, configuration settings for each dwell in a set of next possible dwells to be executed by the receiver; and stores the configuration settings for each dwell in the set of next possible dwells in the memory.

DETAILED DESCRIPTION

Figure 1:
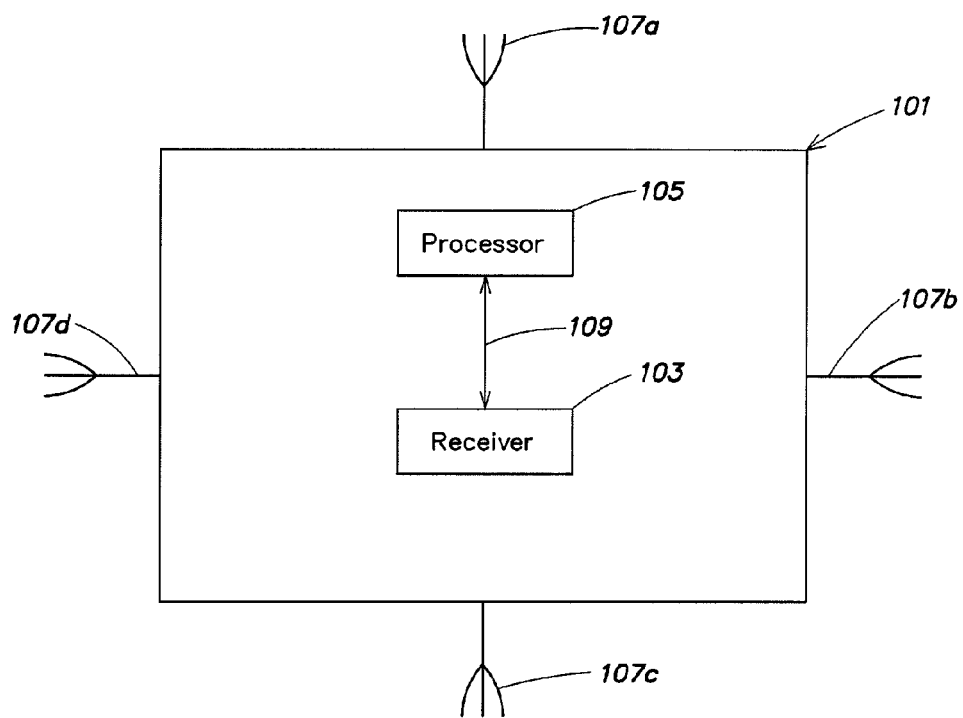
FIG. 1 is a block diagram of a system on which embodiments of the invention may be implemented.

Often it is desirable to use a receiver to attempt to detect multiple different emitters with different signal characteristics. That is, different emitters may transmit signals in different portions of the frequency spectrum, signals having different pulse widths and/or different pulse repetition intervals, and/or signals having other differing characteristics. As a result, if it desired to detect multiple emitters, the receiver may have to be reconfigured in between listening for particular emitters or sets of emitters. Thus, for example, the receiver may be configured to listen for one emitter or set of emitters and then may be reconfigured to listen for another emitter or set of emitters. A particular receiver configuration is referred to herein as a dwell. Each dwell may have an associated duration and revisit time. The duration of a dwell indicates how long the receiver spends in the configuration associated with the dwell and the revisit time indicates how frequently the dwell is executed. Thus, for example, a dwell with a duration of five milliseconds (ms) and a revisit time of 30 ms would be executed for 5 ms and the re-executed every 30 ms.

In some embodiments, a scan strategy may be computed that defines a set of dwells, each of which has an associated duration and revisit time, to be executed by the receiver to attempt to detect a particular set of emitters. The dwells that form the scan strategy may be selected in any suitable way, as the invention is not limited in this respect. For example, in some embodiments, the dwells that form the scan strategy and their associated durations and revisit times may be selected to attempt to detect a specified set of emitters.

In some embodiments, even after a scan strategy is computed, it may not be possible to determine with complete certainty the series of dwells that will be executed by the receiver. For example, in some situations the next dwell to be executed by the receiver after the currently executing dwell may depend on the results of the currently executing dwell. That is, in some embodiments, if a signal of interest is detected during a dwell, it may be desired to execute a dwell extension for that dwell to further sample the signal. For example, the receiver may be in a vehicle with multiple antennas mounted in various locations on the vehicle (e.g., left side, right side, front, and rear) and may have a separate RF channel for each antenna. If a signal of interest is detected during a dwell, the direction from which the signal originated may be determined and it may be desired to execute a dwell extension, in which the dwell is extended, but each antenna is pointed in the direction of the signal to obtain additional information about the signal, such as phase information and/or any other suitable information. Thus, it may not be possible to determine whether the next dwell to be executed after the currently executed dwell will be a dwell extension for the currently executing dwell or a different dwell.

In addition, in some situations, a signal of interest may be detected during a dwell, but the received signal may be too high power or too low power to be suitable for processing. Thus, it may be desirable to re-execute the dwell, but with the receiver configured to add in additional attenuation or amplification to the received signal. Such a re-executed dwell is referred to herein as a "spawn dwell." In some embodiments, during a currently executing dwell, it may not be possible to determine whether the next dwell to be executed will be a spawn dwell of the currently executing dwell or a different dwell. Moreover, in some situations, a scan strategy may include dwells that are referred to herein as a "hard time dwells." A hard time dwell is a dwell which is executed at a specific time (e.g., 14:28:16.250), taking priority over the execution of other dwells. Thus, for example, a hard time dwell may take precedence of a spawn dwell or dwell extension of a currently executing dwell. Further, in some situations, a human operator may have the ability to request execution of a particular dwell. Thus, human interruption of a scan strategy may present challenges in pre-determining the sequence of dwells to be executed by a receiver.

The examples above are merely a few examples of reasons why the sequence of dwells to be executed by a receiver may be non-deterministic. Applicants have appreciated that this sequence may be non-deterministic for other reasons and the invention is not limited to use with scan strategies that are non deterministic for the reasons described above. Moreover, in some embodiments, the sequence of dwells in the scan strategy may be deterministic and the invention is not limited to use with non-deterministic dwell sequences.

FIG. 1 shows a vehicle 101 that includes a receiver 103, a processor 105, antennas 107a, 107b, 107c, and 107d, and communication link 109. Each of antennas 107a, 107b, 107c, and 107d may be an individual antenna or an antenna array. Processor 105 may be a general purpose processor in, for example, the mission computer of vehicle 101 or another on-board computer. Processor 105 may determine a next dwell to be executed by receiver 103 (e.g., based on a scan strategy) and may send commands over link 109 to receiver 103 to configure the receiver. Receiver 103 may receive and process signals received from antennas 107 and may return information about the received signals and/or the signals themselves to processor 105.

In the example above, vehicle 101 has four antennas. However, the invention is not limited in this respect as a vehicle in which the receiver is situated may have any suitable number of antennas. Further, vehicle 101 may be any suitable type of vehicle, such as, for example, an aircraft, a land vehicle, a marine vehicle (e.g, a vessel or submarine), and/or any combination thereof.

In FIG. 1, receiver 103, processor 105, and antennas 107 are situated in a vehicle. However, the invention is not limited in this respect, as these elements may be situated in a ground-based stationary platform, in a portable platform, or in any other suitable platform.

Applicants have appreciated that there may be a delay in between the end of execution of one dwell by the receiver and the beginning of the execution of the next dwell. This delay is, in part, a result of the time taken to configure the receiver for the next dwell. The period in between execution of dwells is referred to herein as "shadow time." The shadow time between dwells may reduce the efficiency of the receiver in detecting emitters. That is, while the receiver is being configured in between execution of dwells, it is not being utilized to detect signals. Thus, larger shadow times decrease utilization of the receiver, and as the utilization of the receiver decreases the time taken to detect an emitter and report its detection (e.g., to a pilot of a vehicle in which the receiver is situated) increases.

Applicants have further appreciated that a large portion of the shadow time between dwells results from time taken to send configuration commands from processor 105 to receiver 103. These commands may be, for example, configuration commands for antenna switch settings, frequency tuning settings, time settings (e.g., dwell duration), threshold settings (e.g., minimum pulse width reject threshold), attenuation and amplification settings, and/or any other suitable receiver settings. In some situations, a large number of commands may be sent from processor 105 to receiver 103 to configure receiver 103 for a particular dwell and the shadow time may be large.

One embodiment of the invention is directed to reducing shadow time between dwells by pre-loading dwell configuration settings in the receiver during execution of the current dwell. This may be done in any suitable way, as the invention is not limited in this respect. By pre-loading the configuration settings for subsequent dwells in the receiver during execution of the current dwell, the shadow time may be reduced, as the configuration settings for the next dwell may be loaded into the receiver prior to completion of the currently executing dwell. As a result, after completing execution of a dwell, the receiver need not wait to receive configuration commands from the process before beginning execution of the next dwell.

As discussed above, in some embodiments, it may not be possible to determine which dwell is to be executed next until after the currently executing dwell completes. Thus, in some embodiments, a set of possible dwells to be executed after the currently executing dwell may be determined and the configuration settings for these dwells may be sent to the receiver, for example, during the currently executing dwell. When execution of the currently executing dwell completes, it may be determined which dwell the receiver should execute next. If the receiver configuration settings are already loaded in the receiver, the receiver may be instructed to execute the dwell. Thus, the receiver may execute the dwell without having to wait to receive configuration information for the dwell.

Figure 2:
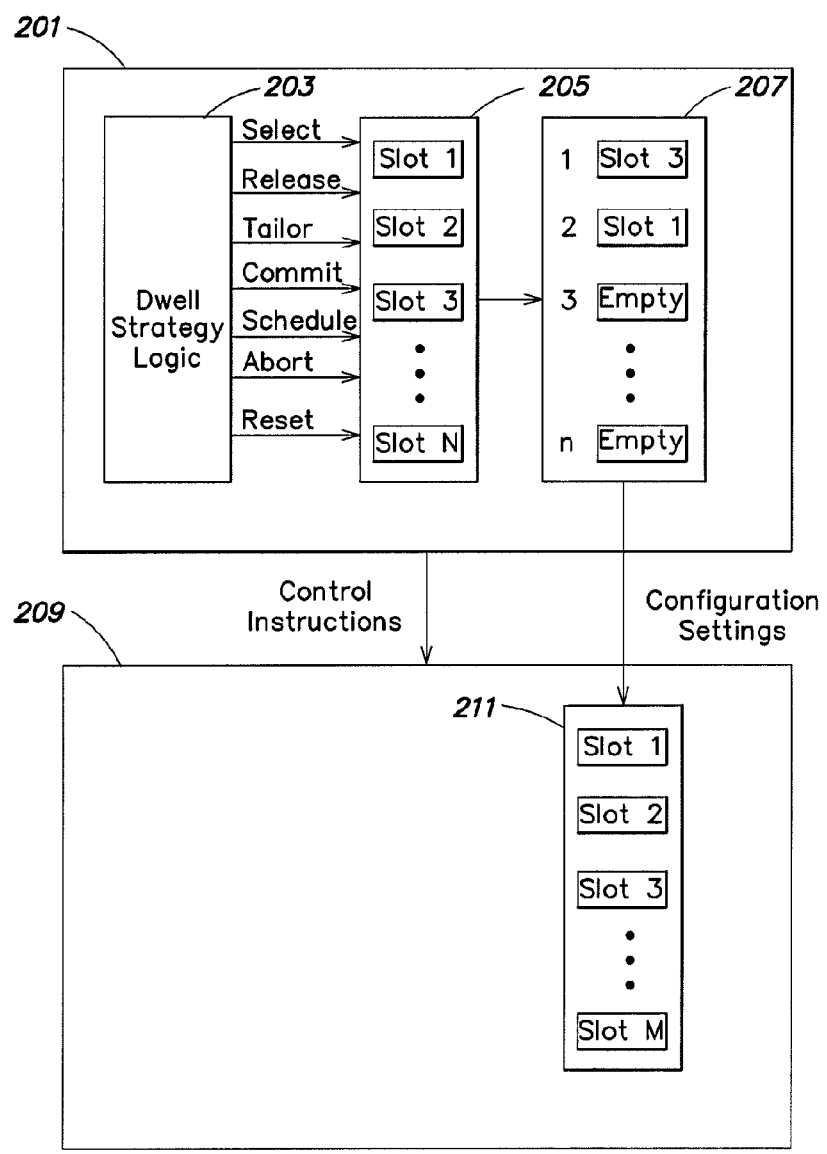
FIG. 2 is a block diagram of processor configured to send configuration settings to a receiver during execution of a dwell, in accordance with some embodiments.

For example, as shown in FIG. 2, controller 201 includes dwell strategy logic 203, dwell list 205, and run list 207. Receiver 209 includes instruction cache 211. Each slot in instruction cache 211 stores the receiver configuration settings for a particular dwell. Dwell strategy logic 203 performs the scheduling of execution of dwells by receiver 209. In the example of FIG. 2, dwell strategy logic 203 may perform a number of functions to schedule the execution of dwells. Dwell strategy logic 203 may perform a Select function which selects and initializes a slot in dwell list 205. Each slot in dwell list 205 may store configuration settings for a particular dwell. The Select function may create a unique serial number identifying the slot that may be used for future operations on the slot. The Release function returns a specified slot back to the memory pool so that it may be used to store the configuration settings for other dwells. The Tailor function is used to "tailor" a dwell in run list 207. That is, the Tailor function may be used to specify how a dwell in run list 207 is to be executed by adding additional configuration settings into the data structure that stores the configuration settings for the dwell. The Commit function is used to load the configuration settings for a dwell in run list 207 into a slot of instruction cache 211 of receiver 209. The Schedule function moves a dwell in dwell list 205 into run list 207 so that the dwell will be executed by the receiver when the receiver is available. It is possible to modify the configuration settings of a dwell in the run list using the Tailor function described above. The Abort function is used to prevent a dwell that has been scheduled (i.e. placed in the run list) from executing and/or to stop a currently executing dwell from completing. This function may be used to allow a higher priority dwell to run immediately. The Reset function is used to abort any dwell that is currently executing and to simultaneously re-initialize all dwell slots to an unused state.

Controller 201 may be implemented in any suitable way, as the invention is not limited in this respect. For example, controller 201 may be implemented in hardware, software, firmware, or any combination thereof.

Table 1 below is a table representing an instruction cache 211 having six slots (i.e., slots A-F). In the example below, each slot is identified by a letter (A-F). However, the invention is not limited in this respect, as a slot may be identified or addressed in any suitable way.

Each slot stores a dwell, which may be either an initial dwell or a dwell extension. As discussed above, a dwell extension is an extension of a dwell that may be used to focus in on a specific field of view. Thus, for example, the dwell in Slot A is an initial dwell with a center frequency of 15 GHz and a field of view of 360 degrees. The method used to determine the angle of arrival of a signal is amplitude DF. The dwells in slots B-E are dwell extensions of dwell A, with each focusing in on a different field of view. Thus, for example, if a signal of interest is detected in a particular portion of the field of view during the initial dwell, the dwell extension corresponding to that portion of the field of view may be executed to obtain additional and/or more precise information about the received signal. The dwell in slot F is the next dwell scheduled for execution after dwell A, which is an initial dwell with a center frequency of 25 GHz.

TABLE 1

| Slot | Dwell Type | Center Frequency (GHz) | Field of View (Degrees) | AOA Method |
| --- | --- | --- | --- | --- |
| A | Initial | 15 | 0-360 | Amplitude DF |
| B | Extension | 15 | 0-90 | Interferometry Phase DF |
| C | Extension | 15 | 90-180 | Interferometry Phase DF |
| D | Extension | 15 | 180-270 | Interferometry Phase DF |
| E | Extension | 15 | 270-360 | Interferometry Phase DF |
| F | Initial | 25 | 0-360 | Amplitude DF |

In some embodiments, the pre-loading of dwells into the receiver may occur as follows. Initially, the receiver executes the dwell in Slot A. The results of this dwell indicate that the only signals of interest are in the field of 90-180 degrees and 180-270 degrees (i.e., the fields of view of slots C and D, respectively). Thus, the next dwells scheduled for execution may be the dwells in slots C, D, and F, sequentially. Because these dwells are already loaded into instruction cache 211 of the receiver, the receiver need not await configuration information for these dwells from the controller after the dwell in slot A has completed execution.

Slots A, B, and E may be released and the memory in instruction cache 211 used for these slots may be freed to store other dwells. Slots A, B, and E may be then be populated with the dwell extensions for the initial dwell in slot F. This may be done while the dwell in slot C, the dwell in slot D, and/or the dwell in slot F are being executed by the receiver. After slot C completes execution, the receiver is instructed to execute the dwell in slot D and the dwell in slot C may be released and freed to store another dwell. Slot C may then be populated with a dwell extension for the dwell in Slot F. This may be done while the dwell in slot D and/or the dwell in slot F are being executed by the receiver.

After the dwell in slot D completes execution, the receiver is instructed to execute the dwell stored in slot F. The dwell in slot D is released and the associated memory in instruction cache 211 is freed to store another dwell. Slot D may then be populated by the next initial dwell scheduled to run after slot F. This may be done while the dwell in slot F is executing.

This process for populating instruction cache 211 with the next dwell extensions and next initial dwell may be repeated for the remaining dwells in the scan strategy. In the example above, instruction cache 211 has six slots and each initial dwell has four extension dwells. However, the invention is not limited in this respect, as the receiver instruction cache may have any suitable number of slots and each initial dwell may have any suitable number of dwell extensions. For example, if the vehicle in which the receiver is situated has eight antennas distributed around the vehicle, each dwell may have eight dwell extensions, each with a field of view of 45 degrees.

Figure 3A:
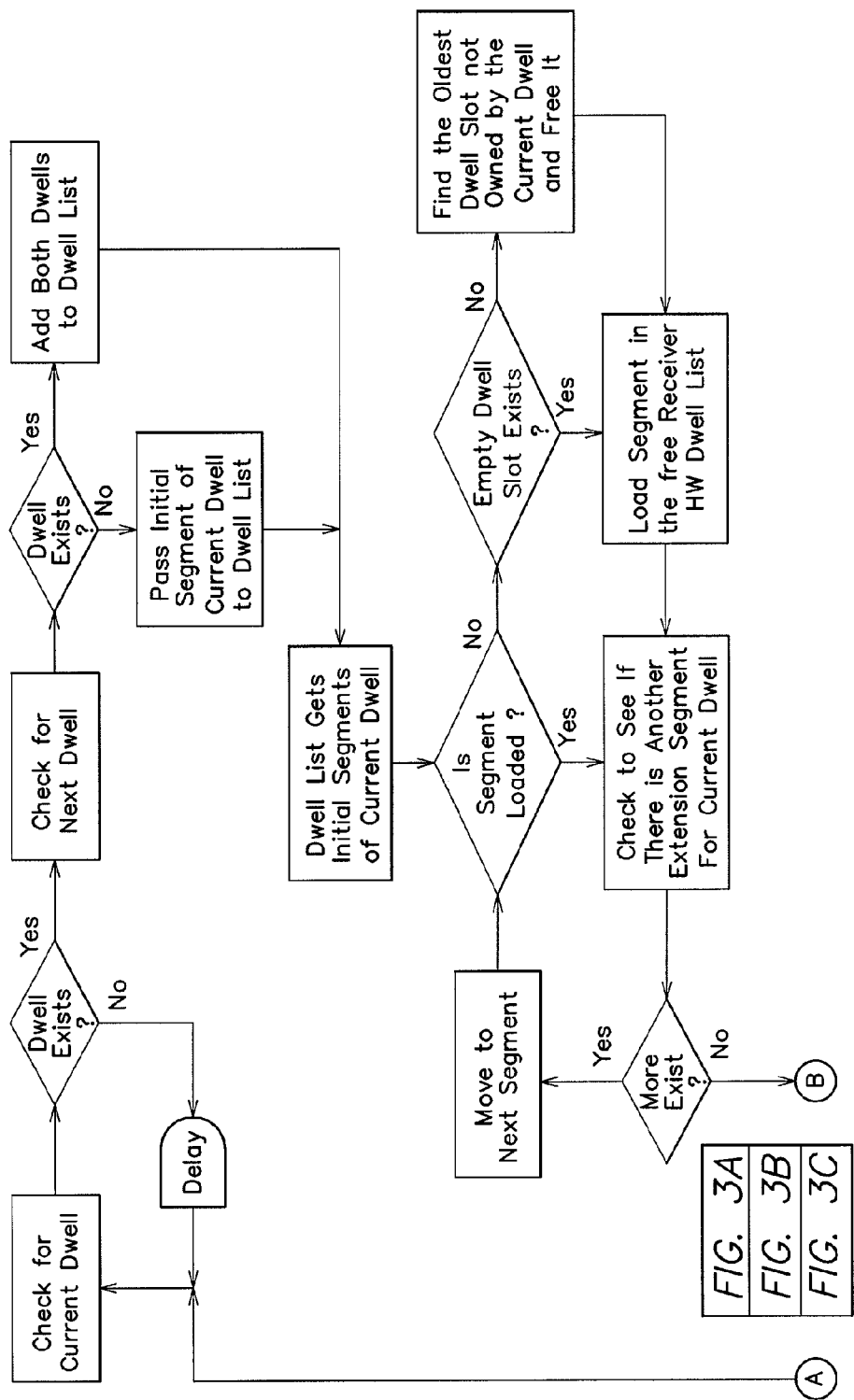
FIG. 3 is a flow chart of an illustrative process for determining dwells to be cached in a receiver in accordance with some embodiments.
Figure 3B:
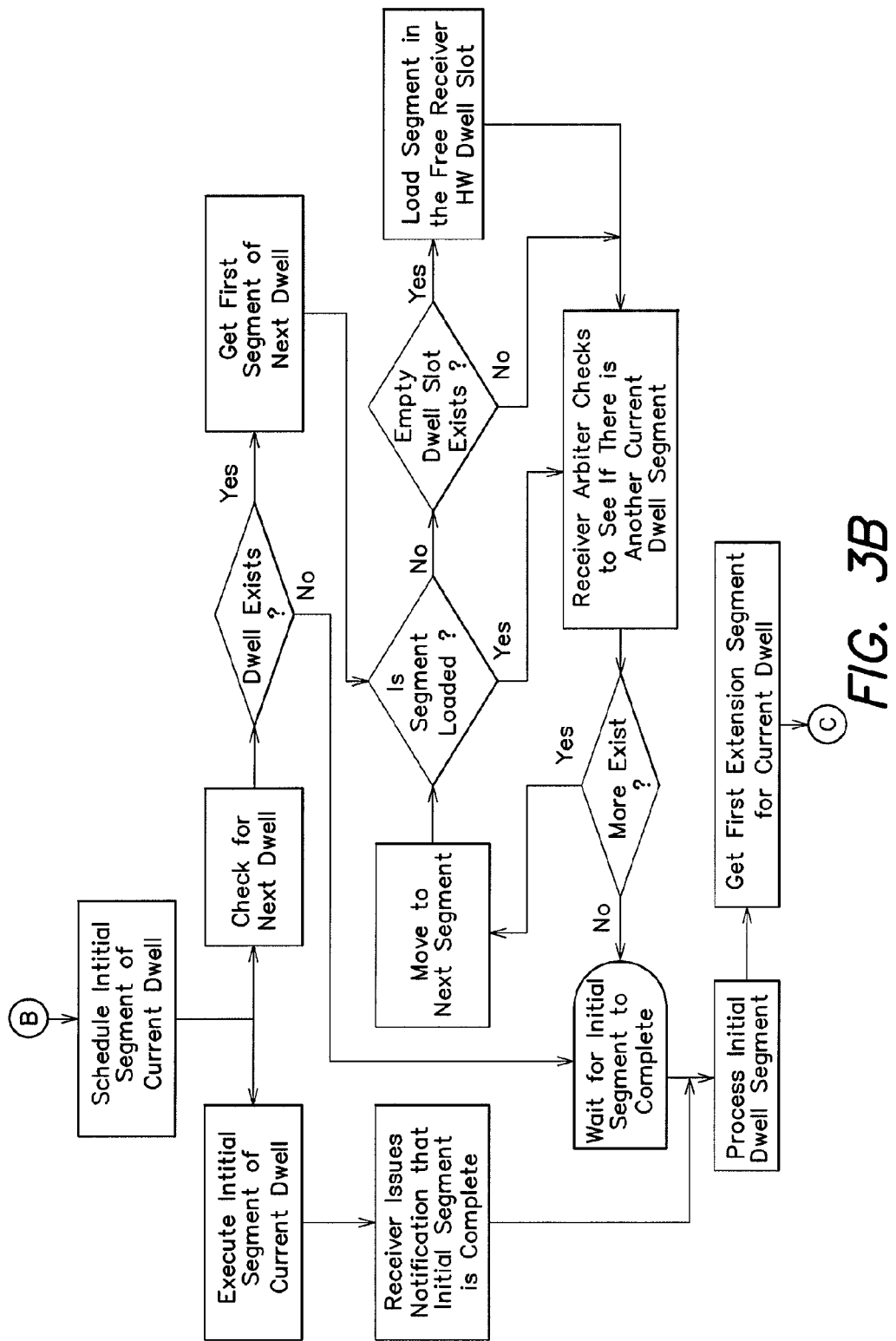
Figure 3C:
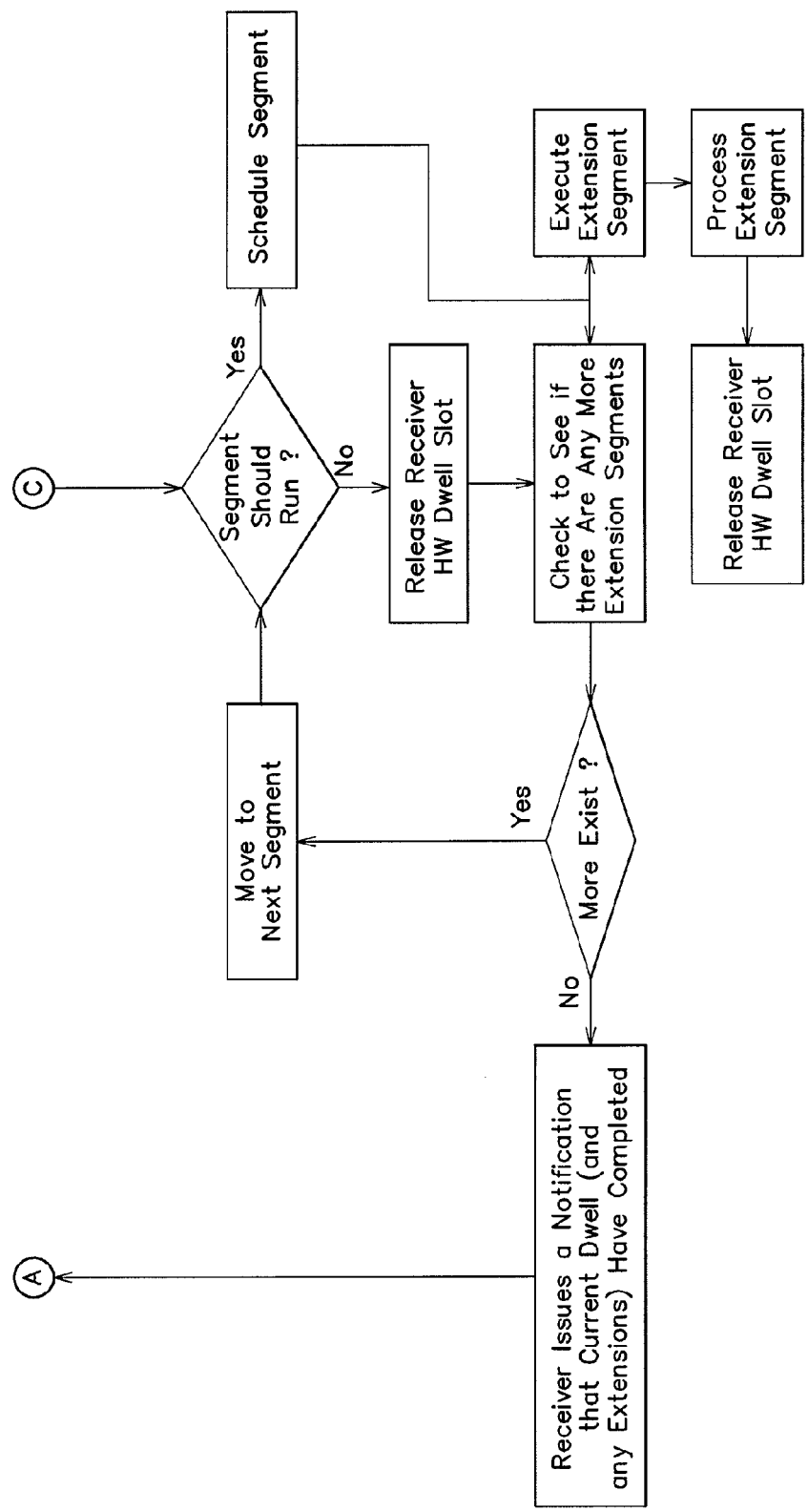

Any suitable algorithm may be used to pre-load dwells into the instruction cache of the receiver, as the invention is not limited in this respect. FIG. 3 shows a flow chart of one example of an algorithm that may be used in some embodiments of the invention. The process begins in the top left corner of the flow chart where a check to determine if the current dwell to be executed by the receiver exists. If not, a delay occurs and the check is performed again. If the current dwell exists, a check is performed to determine if the next dwell exists. If not, the current dwell is added to the dwell list. If the next dwell does exist, both the current dwell and next dwell are added to the dwell list. Once the dwell list gets the initial segment of the current dwell, a check is performed to determine if the segment is loaded in the receiver. If this segment is not loaded in the receiver, it is determined if any empty dwell slots exist in the instruction cache of the receiver. If so, the segment is loaded in an empty dwell slot. If not, the oldest dwell slot not associated with the current dwell is located and freed and the segment is added to the current dwell slot.

Next, a check is performed to see if there are any dwell extension segments for the current dwell. If so, for each dwell extension segment, a check is performed to determine if the segment is loaded in the receiver and, if not, each dwell extension segment is loaded into the receiver. Once all segments of the current dwell are loaded in the receiver, the initial segment is scheduled for execution and the receiver executes the initial segment. When execution of the initial segment is complete, the receiver issues a notification that the initial segment is complete. The initial segment is processed and, based on this processing, it is determined if any of the dwell extension segments should run. If it is determined that an extension segment should execute, the segment is scheduled and executed. While the segment is executing, it may be determined if any other extension segments should be run and, if so, these segments may be schedule for execution when the receiver becomes available. If it is determined that an extension segment is not to be run, the slot in the receiver's instruction cache used to store the dwell may be freed.

While the initial dwell segment of the current dwell is executing, prior to execution of any extension segments, a check may be performed to determine if the next dwell exists and, if so, the initial segment of this dwell may be loaded into the receiver (if it has not already been loaded). When the segment is loaded, a check may be performed to determine if there are any dwell extensions for the next dwell that are not loaded and, if so, these dwell extensions may be loaded into the receiver during execution of the current dwell.

It should be appreciated that the flow chart of FIG. 3 is one example of an algorithm that may be used to pre-load dwells in a receiver, and any suitable algorithm may be used, as the invention is not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. The one or more controllers may be included in one or more host computers, one or more storage systems, or any other type of computer that may include one or more storage devices coupled to the one or more controllers.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," or "having," "containing", "involving", and variations thereof herein, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A computer-implemented method of configuring a receiver to execute a scan strategy, the method comprising acts of:
    determining configuration settings for a dwell in the scan strategy for execution by the receiver;
    configuring the receiver, according to the configuration settings, to execute the dwell;
    determining, while the receiver is executing the dwell, configuration settings for each dwell in a set of candidate dwells for execution by the receiver; and
    storing the configuration settings for each dwell in the set of candidate dwells in a memory of the receiver.

2. The method of claim 1, wherein the set of candidate dwells comprises at least one spawn dwell.

3. The method of claim 1, wherein the set of candidate dwells comprises at least one hard time dwell.

4. The method of claim 1, wherein the set of candidate dwells comprises a dwell extension for the dwell.

5. The method of claim 1, wherein the memory of the receiver comprises an instruction cache, and wherein the act of storing the configuration settings for each dwell in the set of candidate dwells in the memory of the receiver further comprises storing the configuration settings for each dwell in the set of candidate dwells in the instruction cache.

6. The method of claim 1, further comprising acts of:
    selecting a next dwell, from the set of candidate dwells, for execution by the receiver;
    retrieving, from the memory, configuration settings for the next dwell; and
    configuring the receiver, according to the configuration settings for the next dwell, to execute the next dwell.

7. At least one non-transitory computer readable medium encoded with processor-executable instructions that, when executed by a hardware processor, perform a method of configuring a receiver to execute a scan strategy, the method comprising acts of:
    receiving configuration settings for a dwell in the scan strategy for execution by the receiver;
    configuring the receiver, according to the configuration settings, to execute the dwell;
    determining, while the receiver is executing the dwell, configuration settings for each dwell in the set of candidate dwells for execution by the receiver; and
    storing the configuration settings for each dwell in the set of candidate dwells in a memory of the receiver.

8. The at least one computer readable medium of claim 7, wherein the set of candidate dwells comprises at least one spawn dwell.

9. The at least one computer readable medium of claim 7, wherein the set of candidate dwells comprises at least one hard time dwell.

10. The at least one computer readable medium of claim 7, wherein the set of candidate dwells comprises a dwell extension for the dwell.

11. The at least one computer readable medium of claim 7, wherein the memory of the receiver comprises an instruction cache, and wherein the act of storing the configuration settings for each dwell in the set of candidate dwells in the memory of the receiver further comprises storing the configuration settings for each dwell in the set of next possible dwells in the instruction cache.

12. The at least one computer readable medium of claim 7, wherein the method further comprises acts of:
    selecting a next dwell, from the set of candidate dwells, for execution by the receiver;

retrieving, from the memory, configuration settings for the next dwell; and configuring the receiver, according to the configuration settings for the next dwells, to execute the next dwell.

13. A computer comprising:
a memory the stores processor-executable instruction for configuring a receiver to execute a scan strategy; and
a processor, coupled to the memory that, upon execution of the processor-executable instructions:
   determines configuration settings for a dwell in the scan strategy for execution by the receiver;
   configures the receiver, according to the configuration settings, to execute the dwell;
   determines, while the receiver is executing the dwell, configuration settings for each dwell in a set of candidate dwells for execution by the receiver; and
   stores the configuration settings for each dwell in the set of candidate dwells in a memory of the receiver.

14. The computer of the claim 13, wherein the set of candidate dwells comprises at least one spawn dwell.

15. The computer of claim 13, wherein the set of candidate dwells comprises at least one hard time dwell.

16. The computer of claim 13, wherein the set of candidate dwells comprises a dwell extension for the dwell.

17. The computer of claim 13, wherein the memory comprises an instruction cache, and wherein the processor stores the configuration settings for each dwell in the set of candidate dwells in the instruction cache.

* * * * *